(12) United States Patent
Lee et al.

(10) Patent No.: US 11,358,456 B2
(45) Date of Patent: Jun. 14, 2022

(54) WEATHER STRIP ASSEMBLY FOR APPLYING TO OPPOSITE SWING DOORS OF VEHICLE

(71) Applicants: Hyundai Motor Company, Seoul (KR); Kia Motors Corporation, Seoul (KR)

(72) Inventors: Jae-Seung Lee, Hwaseong-si (KR); Jai-Hak Kim, Gunpo-si (KR); Dong-Hee Ma, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 16/694,482

(22) Filed: Nov. 25, 2019

(65) Prior Publication Data
US 2020/0189372 A1 Jun. 18, 2020

(30) Foreign Application Priority Data
Dec. 14, 2018 (KR) .................. 10-2018-0162046

(51) Int. Cl.
| | |
|---|---|
| *E06B 7/16* | (2006.01) |
| *B60J 10/40* | (2016.01) |
| *B60J 10/23* | (2016.01) |
| *B60J 5/04* | (2006.01) |
| *B60J 10/86* | (2016.01) |

(52) U.S. Cl.
CPC ............ *B60J 10/40* (2016.02); *B60J 5/0479* (2013.01); *B60J 10/23* (2016.02); *B60J 10/86* (2016.02)

(58) Field of Classification Search
CPC .......... B60J 10/86; B60J 10/23; B60J 5/0479
USPC ........................... 49/366, 367, 368; 296/150
See application file for complete search history.

(56) References Cited

U.S. PATENT DOCUMENTS

| | | | | | |
|---|---|---|---|---|---|
| 661,653 | A | * | 11/1900 | Youlten .................. | E05D 7/081 49/388 |
| 2,933,784 | A | * | 4/1960 | Hooverson ........... | E06B 7/2309 49/480.1 |
| 3,959,927 | A | * | 6/1976 | Good ....................... | E06B 7/16 49/368 |
| 4,194,776 | A | * | 3/1980 | Biebuyck .............. | E05C 19/002 292/346 |
| 4,428,153 | A | * | 1/1984 | Klinger ................ | E05C 19/002 49/310 |

(Continued)

FOREIGN PATENT DOCUMENTS

| | | | | |
|---|---|---|---|---|
| FR | 3014824 B1 | * | 1/2016 | ............... B60J 5/06 |
| KR | 20-0344140 Y1 | | 2/2004 | |

*Primary Examiner* — Jerry E Redman
(74) *Attorney, Agent, or Firm* — Morgan, Lewis & Bockius LLP

(57) ABSTRACT

A weather strip assembly for applying to opposite swing doors configured such that a front end portion of a front door and a rear end portion of a rear door of the opposite swing doors are rotatably connected to a vehicle body respectively to allow sides of a vehicle to be open or closed and airtightly sealing a rear end portion of the front door and a front end portion of the rear door, may include a main sealing member mounted to rotate between the rear end portion of the front door and the front end portion of the rear door to airtightly seal between the rear end portion of the front door and the front end portion of the rear door while rotating when one of the front and rear doors is opened or closed.

16 Claims, 13 Drawing Sheets

(56) References Cited

U.S. PATENT DOCUMENTS

| | | | | |
|---|---|---|---|---|
| 5,581,946 A | * | 12/1996 | Lin | E05C 19/001 |
| | | | | 49/368 |
| 9,709,316 B2 | * | 7/2017 | Miersen | F25D 23/087 |
| 10,099,769 B2 | * | 10/2018 | Macaraeg, Jr. | B64C 1/1461 |
| 2020/0189372 A1 | * | 6/2020 | Lee | B60J 10/40 |
| 2020/0308882 A1 | * | 10/2020 | Salter | E05C 19/161 |

* cited by examiner

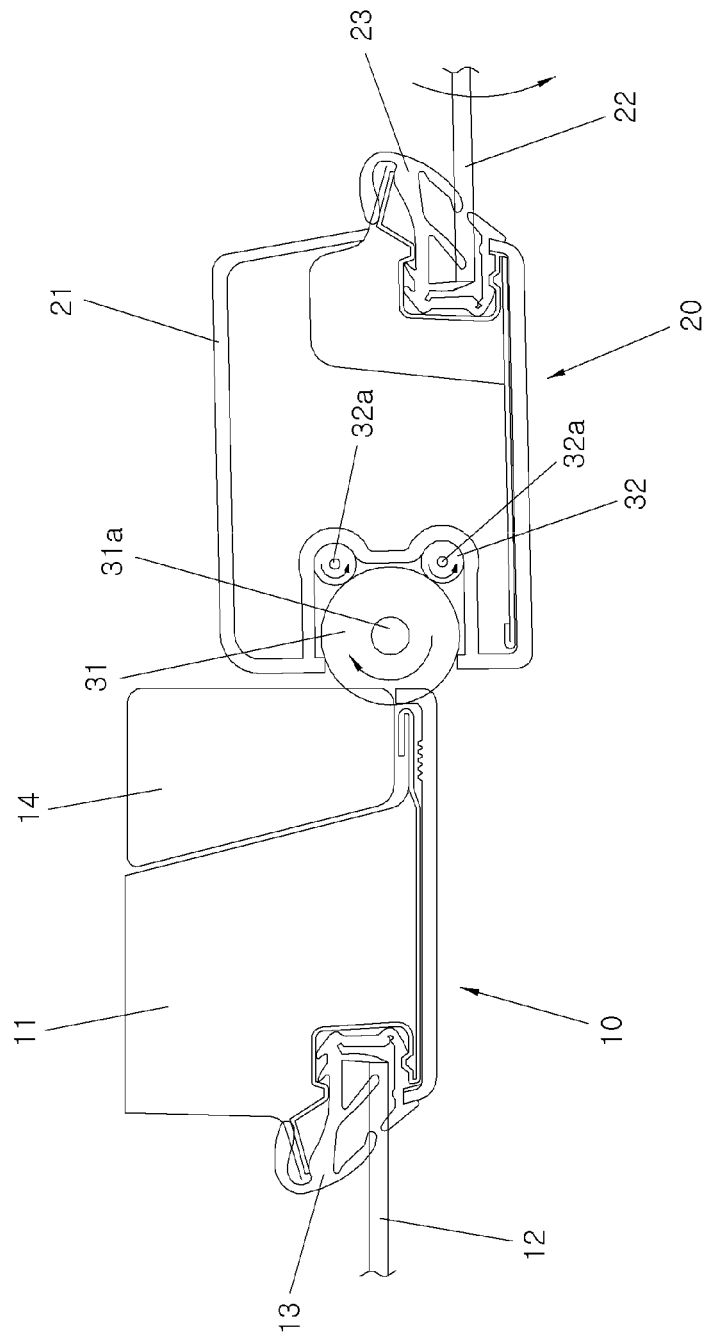

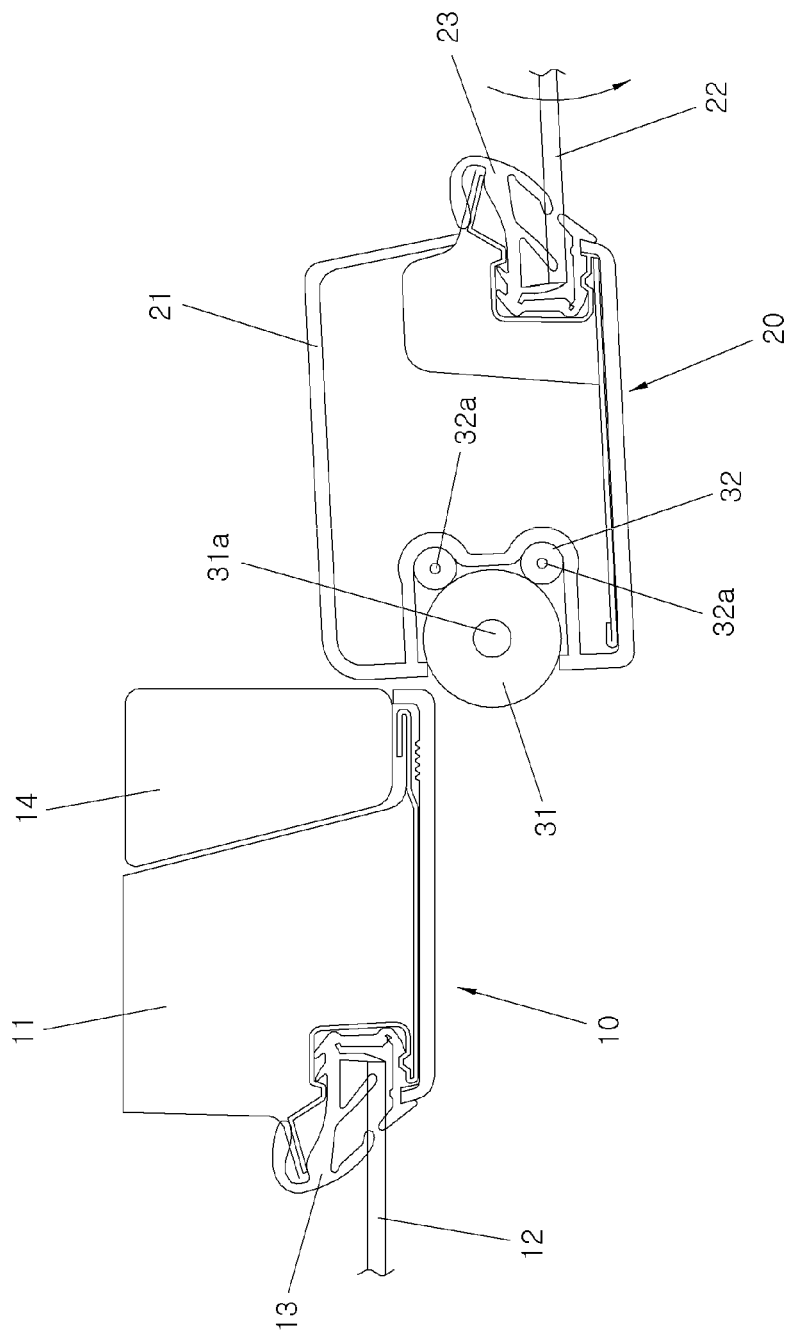

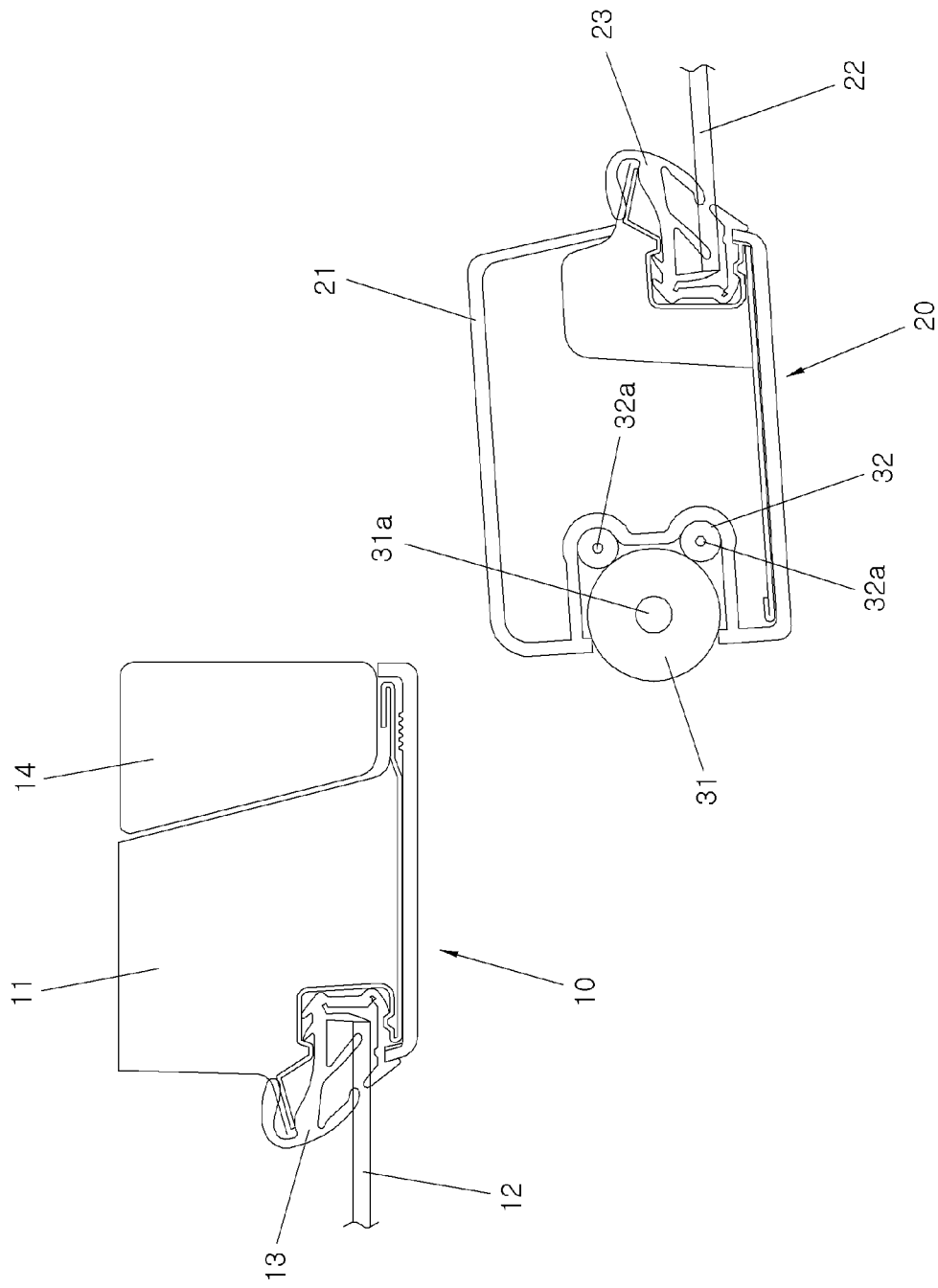

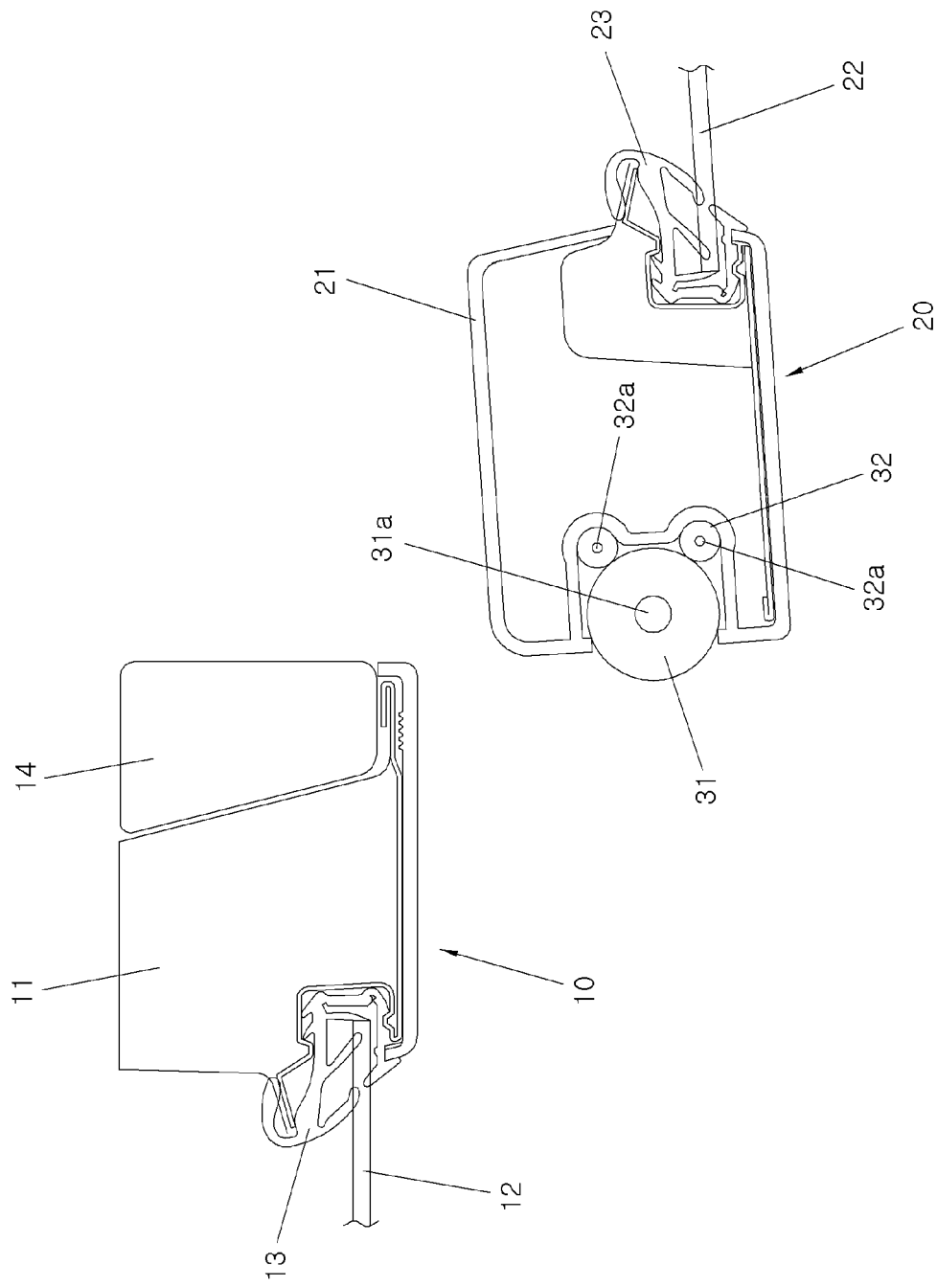

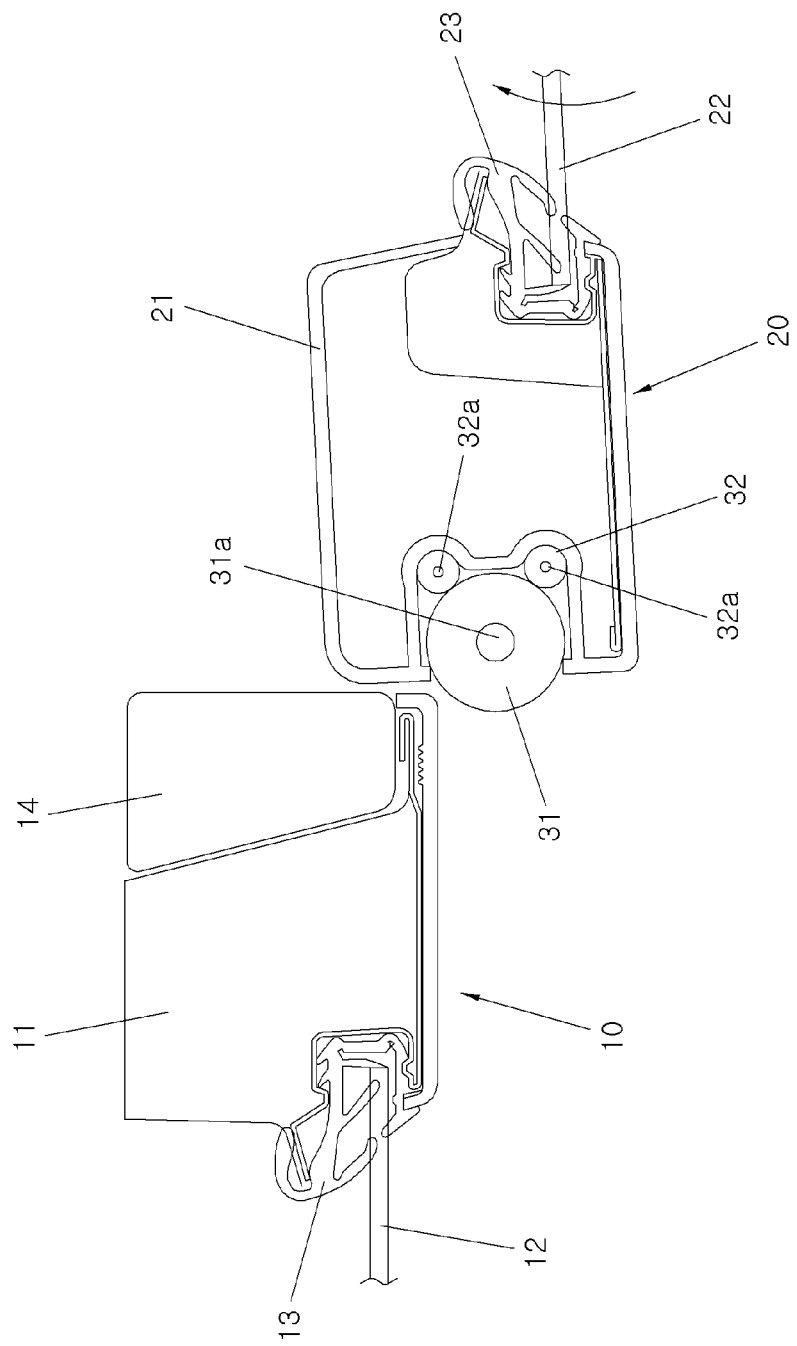

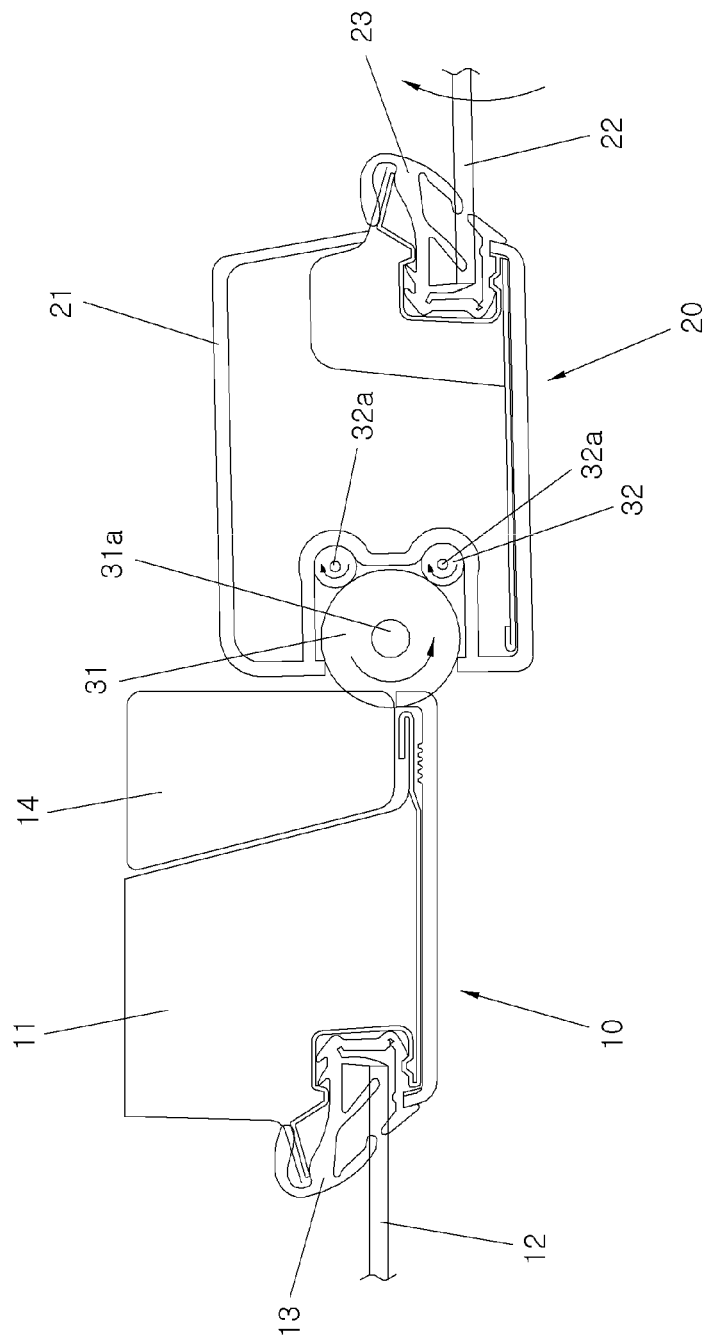

WEATHER STRIP ASSEMBLY FOR APPLYING TO OPPOSITE SWING DOORS OF VEHICLE

CROSS-REFERENCE TO RELATED APPLICATIONS

The present application claims priority to Korean Patent Application No. 10-2018-0162046, filed on Dec. 14, 2018, the entire contents of which is incorporated herein for all purposes by this reference.

BACKGROUND OF THE DISCLOSURE

Field of the Disclosure

The present invention relates to weather strip assembly for airtight sealing of a peripheral portion of a door of a vehicle, and more particularly, to a weather strip assembly for applying to opposite swing doors (or coach doors) to airtightly seal between a front door and a rear door of a vehicle to which the opposite swing doors that are so called in that front and rear doors swing in opposite directions are applied without a center pillar.

Description of Related Art

A vehicle is provided at its sides with doors for allowing passengers to get on/off the vehicle.

A typical vehicle is provided with swing doors having front end portions hinged to a vehicle body and being opened or closed in parallel with the ground plane.

A weather strip made of a rubber material is mounted around the door for airtight sealing when the door is closed. Since the weather strip is made of a rubber material, it airtightly seals the periphery of the door while changing its cross section when the door is closed.

On the other hand, as shown in FIG. 1, there is a vehicle 1 with opposite swing doors, so-called "coach doors" which are actuated to be opened/closed in opposite directions although hinges of the front and rear doors are joined to the vehicle body respectively. In some vehicles, no center pillar is formed to maximize the feeling of being opened wide and allow passengers to get on/off the vehicle more easily.

The opposite swing doors are the same as the normal swing doors in that they are opened in a lateral direction of the vehicle. However, they are distinguished from the normal swing doors in that unlike a front door 110, a rear door 120 is hinged to the vehicle body at a rear end portion of the rear door 120 so that the rear door 120 is opened while rotating about the hinge. FIG. 2 shows a portion where a rear end portion of the front door 110 and a front end portion of the rear door 120 are abutted with each other. The front door 110 is mounted with a glass run 113 for mounting a door glass 112 in a door frame 111 and a weather strip 114 for arranging at a portion where the front door is abutted against the rear door 120. The rear door 120 is mounted with a glass run 123 for mounting a door glass 122 in a door frame 121 and a weather strip 124 for arranging at a portion where the rear door is abutted against the rear door 110.

According to the present structure, the opposite swing doors applied to a vehicle without a center pillar has an advantage of giving excellent feeling of being opened wide in the middle portion of the vehicle when the front door 110 and the rear door 120 are opened but has a disadvantage in that the front door 110 and the rear door 120 are opened or closed in a predetermined order. In other words, the opposite swing doors are also configured such that weather strips 114 and 124 for airtight sealing between the doors 110 and 120 and the vehicle body are mounted in the doors 110 and 120 respectively, wherein when the doors are closed, the weather strips 114 and 124 mounted in the doors 110 and 120 are overlapped with each other at a portion where the rear end portion of the front door 110 and the front end portion of the rear door 120 are abutted with each other. For example, as shown in FIG. 2, since the rear door 120 is opened or closed along a trajectory line A whereas a tip end portion of the weather strip of the rear door moves along a trajectory line B when the rear door is opened or closed, overlapping of the door and the weather strip occurs between the trajectory lines A and B. Such overlapping causes the weather strip to be worn down.

To avoid this, opening or closing order of the front and rear doors 110 and 120 are defined. For example, the front door 110 is first opened when the doors are opened while the rear door 120 is first closed when the doors are closed. If a vehicle 1 has a center pillar, the front door 110 and the rear door 120 may be sealed with the center pillar, respectively. However, in a vehicle without a center pillar, the front door 110 and the rear door 120 may be in contact with each other to secure airtight sealing and therefore airtight sealing between the front door 110 and the rear door 120 is insufficient.

In the vehicle with the opposite swing doors, if the opening or closing order of the doors is not followed, it is likely impossible to open or close the doors 110 and 120. Otherwise, even if it is possible to open or close the doors 110 and 120, the weather strip 114 mounted in the front door 110 and the weather strip 124 mounted in the rear door 120 may interfere with each other. As a result, the weather strips are broken and therefore airtight sealing between the doors 110 and 120 and the vehicle body is not secured so that foreign substances such as rainwater and dust are introduced into the interior of the vehicle 1 or external noise is transmitted into the vehicle interior.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a weather strip assembly for applying to opposite swing doors, which is configured such that an airtight sealing member mounted between a front door and a rear door allows the doors to be opened or closed regardless of the opening or closing order of the doors when the doors is to be opened or closed.

Various aspects of the present invention are directed to providing a weather strip assembly for applying to opposite swing doors, which is configured to reduce a phenomenon that an airtight sealing member mounted between a front door and a rear door is worn down by friction when the door is opened or closed.

Other objects and advantages of the present invention may be understood by the following description and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In accordance with one aspect of the present invention for accomplishing the objects as mentioned above, there is provided a weather strip assembly for applying to opposite swing doors configured such that a front end portion of a front door and a rear end portion of a rear door of the opposite swing doors are rotatably connected to a vehicle body respectively to allow sides of a vehicle to be opened or closed and airtightly sealing a rear end portion of the front door and a front end portion of the rear door, wherein the weather strip assembly includes a main sealing member mounted to rotate between the rear end portion of the front door and the front end portion of the rear door to airtightly seal between the rear end portion of the front door and the front end portion of the rear door while rotating when one of the front and rear doors is opened or closed.

The weather strip assembly is characterized in that the main sealing member includes a compressible flexible material to airtightly seal between the rear end portion of the front door and the front end portion of the rear door.

The weather strip assembly is characterized in that the main sealing member is formed in a shape of a cylindrical column mounted in a height direction of the vehicle.

The weather strip assembly is characterized in that the main sealing member includes a main sealing rotation shaft passing through the main sealing member and rotatably mounted in one of the front and rear doors.

The weather strip assembly is characterized in that the main sealing rotation shaft is rotatably mounted in fixing blocks formed at an upper end portion and a lower end portion of the door respectively.

The weather strip assembly is characterized in that a sealing receiving recess is formed at an end portion of a door frame of the door in a manner of being recessed from the end portion of the door frame to receive the main sealing member therein.

The weather strip assembly is characterized in that the sealing receiving recess is provided with ledges for catching a main sealing member to restrain the main sealing member such that the main sealing member inserted into the sealing receiving recess is not broken away from the sealing receiving recess and allowing a portion of the side surface of the main sealing member to be exposed.

The weather strip assembly is characterized in that the sealing receiving recess is provided with sub-sealing members for rotatably supporting the main sealing member in the sealing receiving recess.

The weather strip assembly is characterized in that the sub-sealing members are formed in a shape of a cylindrical column having a diameter smaller than a diameter of the main sealing member.

The weather strip assembly is characterized in that the sub-sealing member includes a sub-sealing rotation shaft passing through the sub-sealing member and rotatably mounted in one of the front and rear doors.

The weather strip assembly is characterized in that the sub-sealing rotation shaft is rotatably mounted in the fixing blocks formed at the upper end portion and the lower end portion of the door respectively.

The weather strip assembly is characterized in that a plurality of sub-sealing members are formed to be spaced from each other.

The weather strip assembly is characterized in that a sub-sealing receiving portion for receiving the sub-sealing member and supporting a side of the sub-sealing member is formed at one side of the sealing receiving recess.

The weather strip assembly is characterized in that the main sealing member and the sub-sealing member are produced in a form extruded by extruding an elastic material, respectively.

The weather strip assembly is characterized in that the main sealing member is provided in one of the front and rear doors while a guide block for abutting against the main sealing member is formed in a height direction of the vehicle in the other door.

The weather strip assembly is characterized in that the main sealing member is provided at the front end portion of the rear door while the guide block is formed at the rear end portion of the front door.

The weather strip assembly is characterized in that no center pillar is formed in the vehicle.

In the weather strip assembly for applying to opposite swing doors according to an exemplary embodiment of the present invention having the features as described above, the feature that the main sealing member is deformed concurrently with rotation of the door improves airtight sealing performance of the front and rear doors in a vehicle with the opposite swing doors.

Furthermore, since friction does not substantially act between the weather strip and the adjacent door when the doors are opened, either the front door or the rear door may be opened regardless of the opening order.

Since the doors may be opened or closed regardless of the opening/closing order as described above, it is easy for a passenger getting/got into a backseat to get on/off the vehicle.

Furthermore, since friction does not act on the main sealing member, abrasion due to friction during opening or closing of the doors is reduced.

It is to be understood that both the foregoing general description and the following detailed description of the present invention are exemplary and explanatory and are intended to provide further explanation of the present invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6A, FIG. 6B, FIG. 6C, and FIG. 6D are sectional views sequentially showing states in a process of opening doors to which a weather strip assembly for applying to opposite swing doors according to an exemplary embodiment of the present invention is applied; and FIG. 7A, FIG. 7B, FIG. 7C, and FIG. 7D are sectional views sequentially showing states in a process of closing doors to which a weather strip assembly for applying to opposite swing doors according to an exemplary embodiment of the present invention is applied.

Figure 1:
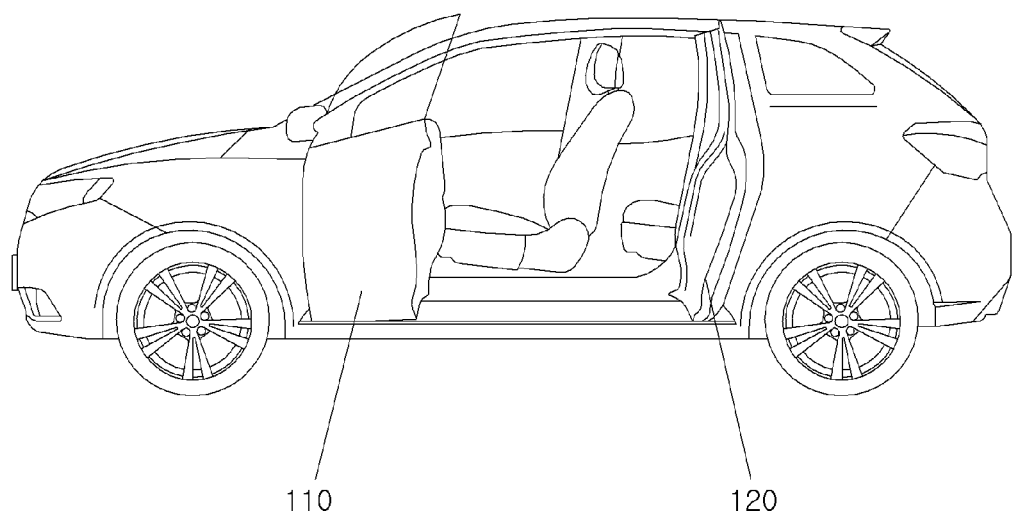
FIG. 1 is a perspective view of a vehicle with opposite swing doors.
Figure 2:
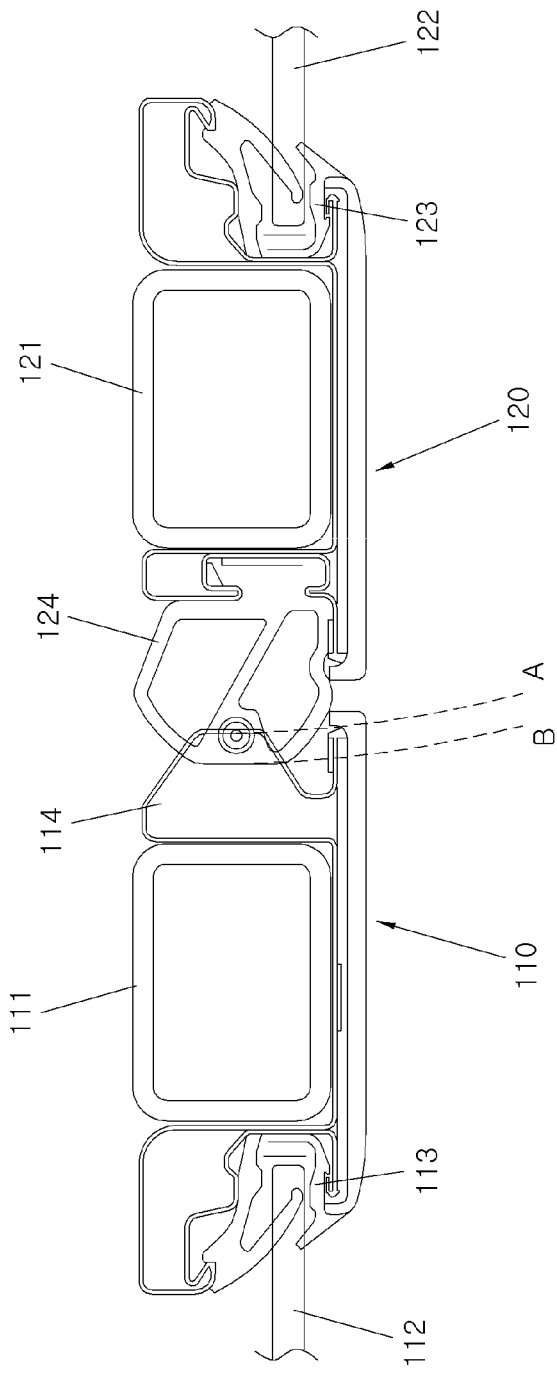
FIG. 2 is a cross-sectional view of a weather strip assembly applied to opposite swing doors according to the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a weather strip assembly applied to opposite swing doors according to an exemplary embodiment of the present invention is described in detail with reference to the accompanying drawings.

A weather strip assembly to be applied to opposite swing doors according to an exemplary embodiment of the present invention is a weather strip assembly for applying to opposite swing doors configured such that a front end portion of a front door 10 and a rear end portion of a rear door 20 are rotatably connected to a vehicle body respectively to allow sides of a vehicle to be opened or closed and airtightly sealing a rear end portion of the front door 10 and a front end portion of the rear door 20, wherein the weather strip assembly includes a main sealing member 31 mounted to rotate between the rear end portion of the front door 10 and the front end portion of the rear door 20 to airtightly seal between the rear end portion of the front door 10 and the front end portion of the rear door 20 while rotating when one of the front and rear doors 10 and 20 is opened or closed.

It is preferable to apply the present invention to a vehicle without a center pillar among vehicles with opposite swing doors. The reason for this is that in the vehicle with opposite swing doors but without a center pillar, airtight sealing may be formed directly in the front door 10 and the rear door 20.

Figure 3:
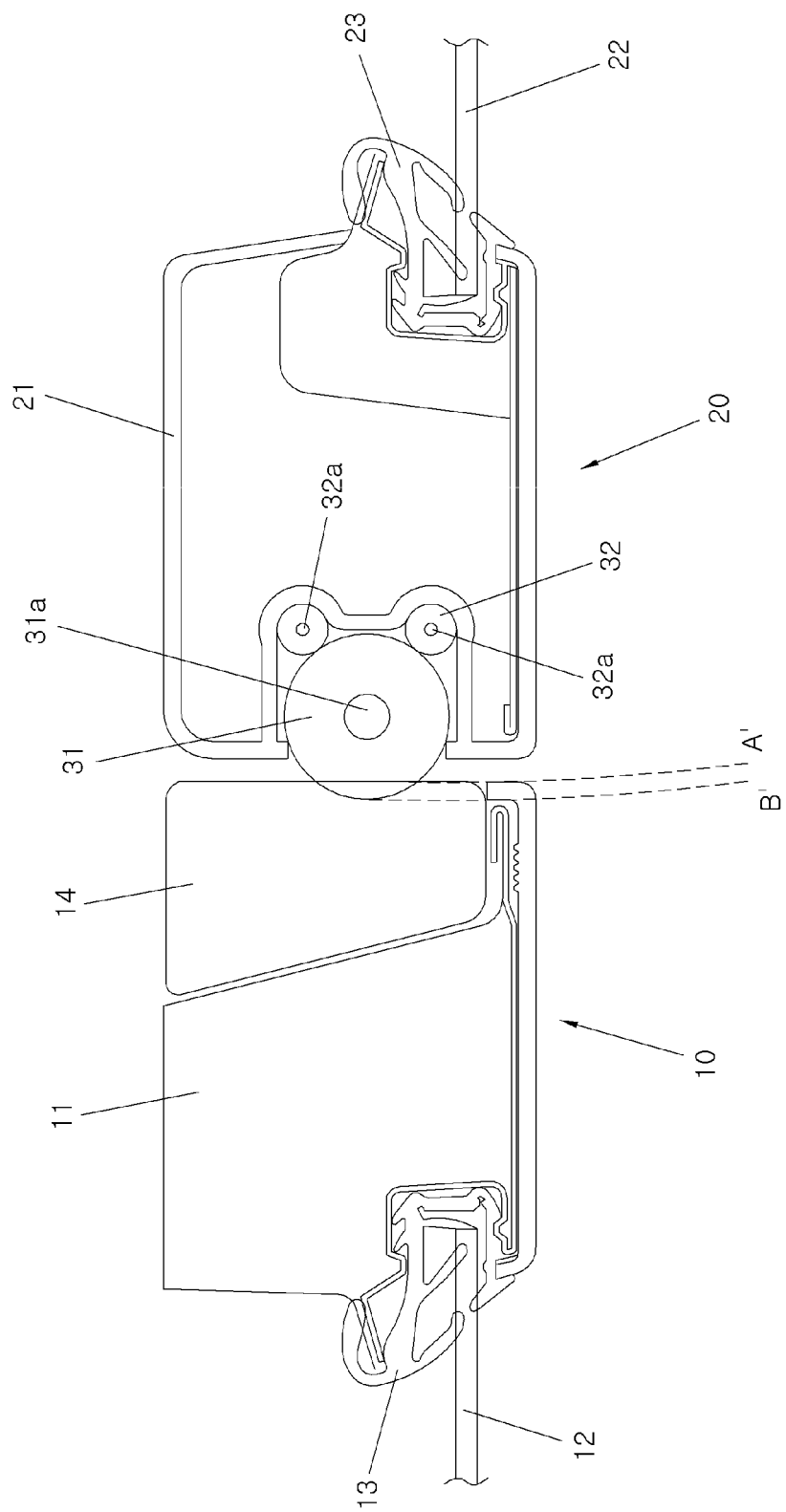
FIG. 3 is a cross-sectional view of a weather strip assembly applied to opposite swing doors according to an exemplary embodiment of the present invention.

As shown in FIG. 3, an exemplary embodiment of the present invention is applied to the rear end portion of the front door 10 and the front end portion of the rear door 20 in a state that a glass run 13 for mounting a door glass 12 in a door frame 11 is mounted in the front door 10 and a glass run 23 for mounting a door glass 22 in a door frame 21 is mounted in the rear door 20.

Furthermore, an exemplary configuration in which the main sealing member 31 and sub-sealing members 32 are mounted in the rear door 20 while a guide block 14 is mounted in the front door 10 as shown in FIG. 3 will be described below. However, it is noted that the main sealing member 31 and the sub-sealing members 32 may be mounted in the front door 10 while the guide block 14 may be mounted in the rear door 20.

The main sealing member 31 is mounted at the rear end portion of the front door 10 or at the front end portion of the rear door 20. FIG. 3 shows an example in which the main sealing member 31 is mounted at the front end portion of the rear door 20. The main sealing member 31 is formed in a shape of a cylindrical column having an axis in a height direction of the vehicle. The main sealing member 31 is formed in the height direction of the vehicle so that the main sealing member 31 airtightly seals between the front door 10 and the rear door 20.

When one of the doors 10 and 20 is opened, the main sealing member 31 is rotated from a state in which the main sealing member 31 is positioned between the rear end portion of the front door 10 and the front end portion of the rear door 20. For example, in the case where the main sealing member 31 is mounted at the front end portion of the rear door 20, when the rear door 20 is opened or closed, the main sealing member 31 is rotated in a direction opposite to the opening or closing direction of the rear door 20 so that friction is reduced and therefore abrasion of the main sealing member 31 is reduced.

Furthermore, the main sealing member 31 is made of a flexible material to be brought into close contact with the rear end portion of the front door 10 or the front end portion of the rear door 20. When the doors 10 and 20 are closed, the main sealing member 31 is compressed because it is made of the flexible material, securing airtight sealing between the front door 10 and the rear door 20. For example, in the case where the main sealing member 31 is mounted in the rear door 20, a portion of the main sealing member 31 abutted against the front door 10 is compressed, securing airtight sealing. For example, the main sealing member 31 may be produced in a form extruded by extruding synthetic resin or rubber.

Furthermore, the surface of the main sealing member 31 is coated with a high friction-resistant material.

Figure 4:
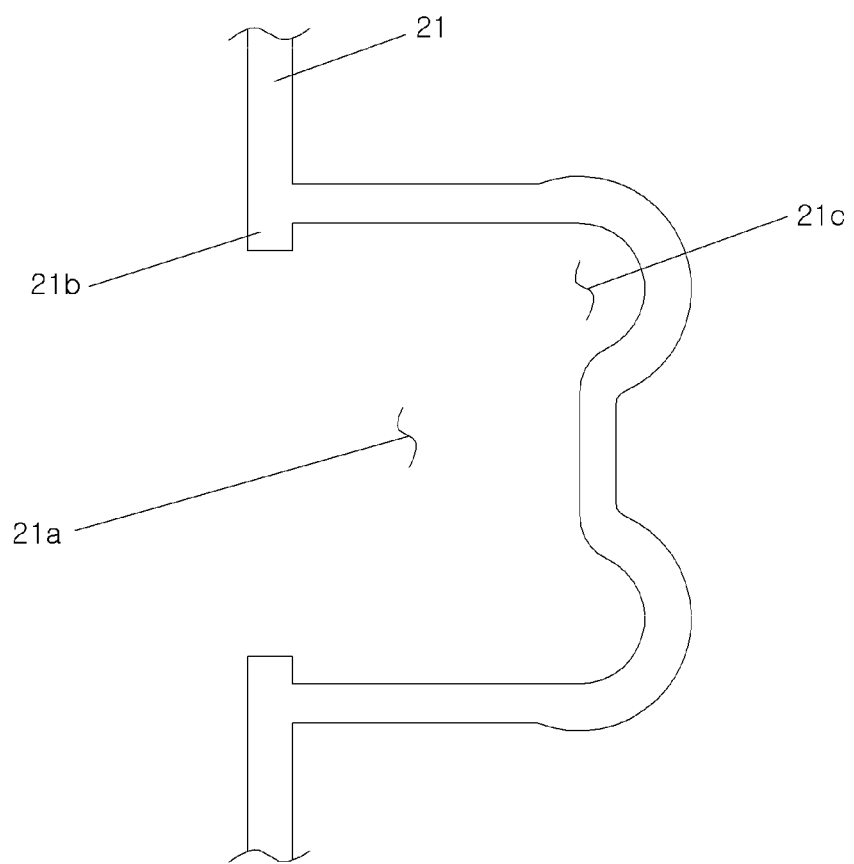
FIG. 4 is a cross-sectional view of a major portion of a door frame of a door adopting a weather strip assembly applied to opposite swing doors according to an exemplary embodiment of the present invention.

To install the main sealing member 31 in the door, the door frame 21 is formed with a sealing receiving recess 21a in which the main sealing member 31 is received. For example, the door frame 21 of the front end portion of the rear door 20 is shown in FIG. 4. The sealing receiving recess 21a is formed at the end portion of the door frame 21 in a manner of being recessed inwardly from the end. The main sealing member 31 having a circular cross section is positioned within the sealing receiving recess 21a.

Ledges 21b for catching the main sealing member are formed in the sealing receiving recess 21a to prevent the main sealing member 31 from being broken away from the sealing receiving recess 21a. The ledges for catching the main sealing member restrain the main sealing member 31 such that the main sealing member 31 is not broken away from the sealing receiving recess 21a and expose a portion of the side of the main sealing member through an opening 21d formed between the ledges 21b.

The sealing receiving recess 21a is provided in its inside with sub-sealing members 32 for supporting the main sealing member 31 in the sealing receiving recess 21a.

The sub-sealing members 32 are configured to support the main sealing member 31, which is rotated when the doors 10 and 20 are opened or closed, from the internal side of main sealing member and to rotate together with the main sealing member 31, allowing the main sealing member 31 to rotate smoothly.

The sub-sealing members 32 are configured to be in contact with the main sealing member 31 so that the direction of rotation of the sub-sealing members 32 is opposite to that of the main sealing member 31.

The sub-sealing members 32 may also be made of the same material as the main seal member 31 and formed in the same shape as the main seal member. However, the sub-sealing member 32 is formed to have a smaller diameter than the main sealing member 31.

Furthermore, a plurality of sub-sealing members 32 are formed to be spaced from each other. For example, FIG. 3 includes an exemplary embodiment in which two sub-sealing members 32 are mounted.

On the other hand, the sealing receiving recesses 21a is formed in its inside with sub-sealing receiving portions 21c for allowing the sub-sealing members 32 to be accommodated therein, respectively. Each sub-sealing portion 21c receives the sub-sealing member 32 and supports a portion of the side surface of the sub-sealing member 32.

Figure 5:
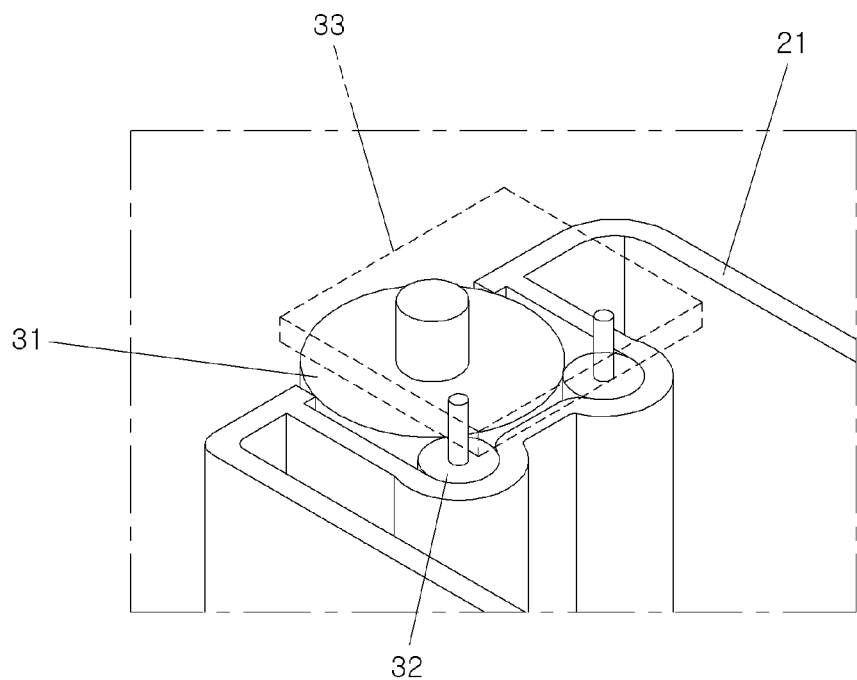
FIG. 5 is an enlarged perspective view of major portions of a door adopting a weather strip assembly applied to opposite swing doors according to an exemplary embodiment of the present invention.

The main sealing member 31 and the sub-sealing members 32 are configured to be rotated when the front door 10 or the rear door 20 is opened or closed. Therefore, the main sealing member 31 and the sub-sealing members 32 are provided in their centers respectively with rotation shafts 31a and 32a for rotating the main sealing member 31 and the sub-sealing members 32 respectively. In other words, a main sealing rotation shaft 31a is formed at the center portion of the main sealing member 31 while sub-sealing rotation shafts 32a are formed at the centers of the sub-sealing members 32 respectively. Furthermore, upper and lower end portions of the main sealing rotation shaft 31a and the sub-sealing rotation shafts 32a are rotatably connected to fixing blocks 33 mounted in the doors 10 and 20 so that the main sealing member 31 and the sub-sealing members 32 may be rotated. FIG. 5 shows an exemplary configuration in which the main sealing rotation shaft 31a and the sub-sealing rotation shafts 32a are mounted at the upper portion of the rear door 20.

On the other hand, the main sealing rotation shaft 31a and the sub-sealing rotation shafts 32a are preferably made of a material having elastic property, such as spring steel.

The door in which the main sealing member 31 is not mounted is provided with a guide block 14 which is brought to abut against the main sealing member 31. For example, in the case where the main sealing member 31 is mounted in the rear door 20, the guide block 14 is mounted in the front door 10.

The guide block 14 is brought into contact with the main sealing member 31 at the time when the door is closed and as a result, the main sealing member 31 is compressed so that airtight sealing between the front door 10 and the rear door 20 is secured. Furthermore, when the door is opened or closed, the guide block is brought into contact with the main sealing member 31 and as a result, forces the main sealing member 31 to rotate in contact with the guide block 14, allowing the doors to be opened or closed smoothly.

Furthermore, as shown in FIG. 3, the rear door 20 is opened or closed along a trajectory line A' and a tip end portion of the main sealing member 31 is moved along a trajectory line B' because the main sealing member 31 is rotated in a compressed state while it is supported by the guide block. However, any overlap between the trajectory line A' and the trajectory line B' does not substantially occur because the main sealing member 31 is rotated in a pressed state against the guide block 14. Furthermore, since the main sealing member 31 is rotated in a pressed state against the guide block 14, abrasion of the main sealing member 31 due to overlapping does not occur.

Next, operation of the weather strip assembly to be applied to the opposite swing doors according to an exemplary embodiment of the present invention having the features as described above will be described.

FIG. 6A, FIG. 6B, FIG. 6C, and FIG. 6D sequentially show states in a process of opening the doors.

Figure 6A:
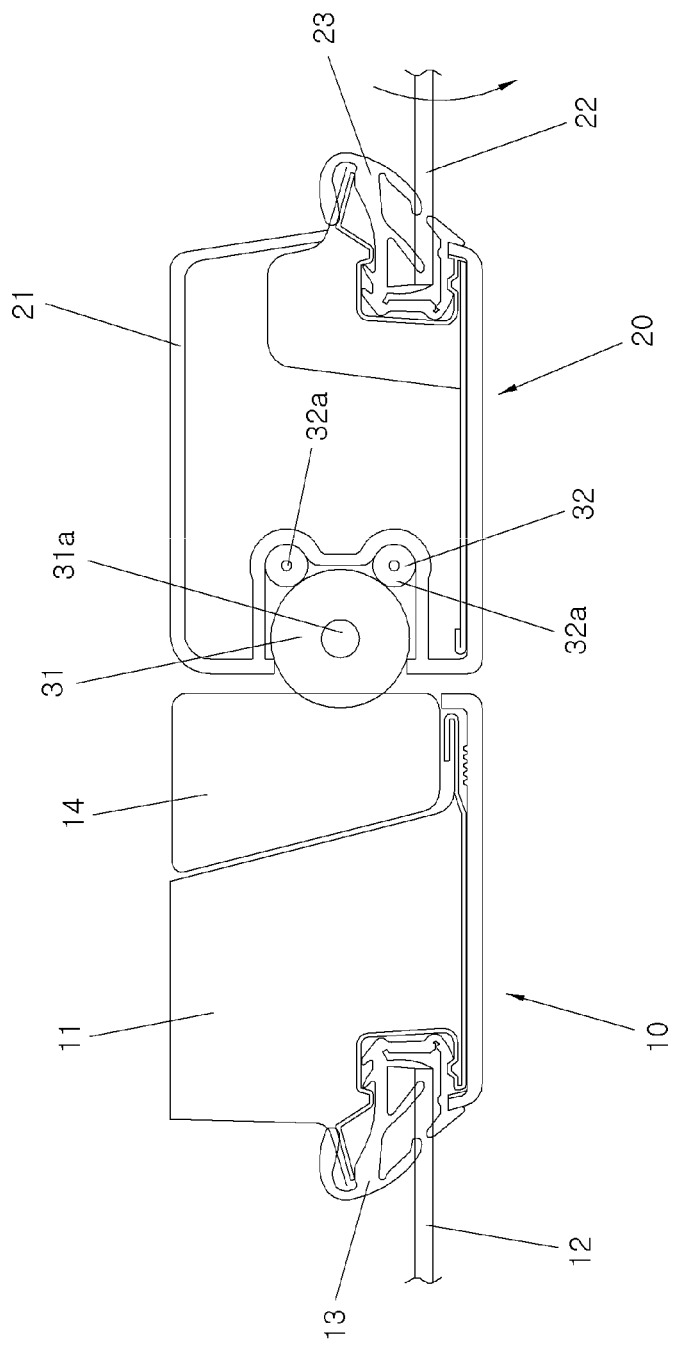
Figure 7D:
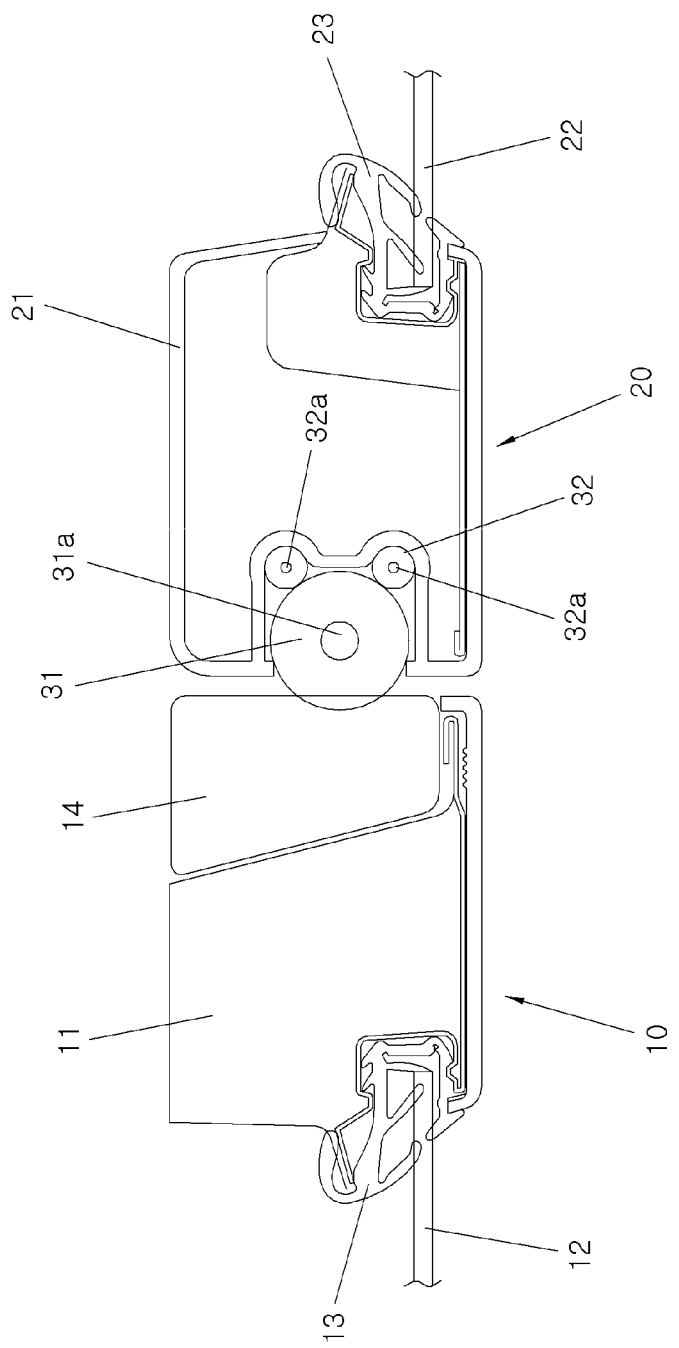

FIG. 6A shows a state in which both the front door 10 and the rear door 20 are closed. Since the main sealing member 31 is in contact with the guide block 14 mounted in the front door 10 when both the front door 10 and the rear door 20 are closed, airtight sealing between the front door 10 and the rear door 20 is kept.

In the present state, when a passenger opens the rear door 20, the rear door 20 starts to rotate about its rear end. When the rear door 20 starts to be opened, the main sealing member 31 rotates in a direction opposite to the rotation direction of the rear door 20 in a state where the main sealing member 31 is in contact with the guide block 14 mounted at the rear end portion of the front door 10 (see FIG. 6B). At the instant time, one side of the main sealing member 31 is supported by the sub-sealing members 32 while the sub-sealing members 32 in contact with the main sealing member 31 are also rotated.

Thereafter, when the rear door 20 continues to be opened, the rear door 20 and the front door 10 are opened to be separated away from each other while the main sealing member 31 is continuously rotated (see FIG. 6C). When the rear door 20 is opened, the main sealing member 31 is compressed in a radial direction simultaneously with its rotation so that the rear door 20 may be opened in a condition that the main sealing member 31 is prevented from being worn down between the main sealing member 31 and the guide block 14. When the front end portion of the rear door 20 is separated away from the front door 10, the main sealing member 31 can also be completely opened without contacting with the front door 10 side (see FIG. 6D).

On the other hand, FIG. 7A, FIG. 7B, FIG. 7C, and FIG. 7D sequentially show states in a process of closing the doors. Closing of the rear door 20 is performed in the reverse order of opening.

FIG. 7A shows a state in which the rear door 20 are completely opened. In the instant state, when the passenger closes the rear door 20, the rear door 20 is rotated about the rear end portion of the rear door 20 without any contact until the front end portion of the rear door 20 abuts on the rear end portion of the front door 10.

Thereafter, as shown in FIG. 7B, when the front end portion of the rear door 20 abuts on the rear end portion of the front door 10, the main sealing member 31 starts to contact with the rear end portion of the front door 10 and at the same time starts to rotate in a direction opposite to the rotation direction of the rear door 20.

Subsequently, when the rear door 20 continues to be closed, the main sealing member 31 contacts with the guide block 14 and rotates in a compressed state in the radial direction (see FIG. 7C).

When the rear door 20 is completely closed through the present process (see FIG. 7D), the main sealing member 31 is in contact with the guide block 14 in a partially compressed state while both the front door 10 and the rear door 20 are closed so that the front door 10 and the rear door 20 are kept closed.

On the other hand, even when the front door 10 is opened from the closed state or closed from the opened state in a state where the rear door 20 is fixed, the main sealing member 31 is rotated even in a state that the rear end portion of the front door 10 and the front end portion of the rear door 20 are in contact with each other so that airtight sealing between the front door 10 and the rear door 20 is secured. In other words, even when the front door 10 is to be opened or closed, the rear end portion of the front door 10, i.e., the guide block 14 is rotated with the front door 10 in a state that it is in contact with the main sealing member 31 and the main sealing member 31 is also rotated in a state that it is in contact with the guide block 14 and partially compressed so that airtight sealing between the front door 10 and the rear door 20 is secured.

As described above, by providing the main sealing member 31 configured to rotate between the front door 10 and the rear door 20, airtight sealing between the front door 10 and the rear door 20 is secured by the main sealing member 31 which is rotated when the doors are opened or closed, and the front door and the rear door may be opened or closed independently in a vehicle with opposite swing doors, a vehicle with opposite swing doors but without a center pillar. Furthermore, since the front door and the rear door may be opened or closed independently, the front door or the rear door may be opened or closed regardless of the opening/closing order.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A weather strip assembly for applying to swing doors including a front door and a rear door configured to be opened or closed in opposite direction to each other so that a front end portion of the front door of the swing doors and a rear end portion of the rear door of the swing doors are rotatably connected to a vehicle body respectively to allow sides of a vehicle to be opened or closed and for airtightly sealing a rear end portion of the front door and a front end portion of the rear door,
wherein the weather strip assembly includes a sealing member mounted to rotate between the rear end portion of the front door and the front end portion of the rear door to airtightly seal between the rear end portion of the front door and the front end portion of the rear door while rotating when one of the front and rear doors is opened or closed, and
wherein the sealing member is made of a compressible flexible material to airtightly seal between the rear end portion of the front door and the front end portion of the rear door.

2. The weather strip assembly according to claim 1, wherein the sealing member is formed in a shape of a cylindrical column mounted in a height direction of the vehicle.

3. The weather strip assembly according to claim 2, further including a first sealing rotation shaft passing through the sealing member and mounted in one of the front and rear doors so that the first sealing member is rotatable about the first sealing rotation shaft.

4. The weather strip assembly according to claim 3, wherein the first sealing rotation shaft is mounted in fixing blocks formed at an upper end portion and a lower end portion of the one of the front and rear doors respectively.

5. The weather strip assembly according to claim 2, wherein a sealing receiving recess is formed at an end portion of a door frame of at least one of the front and rear doors to be recessed from the end portion of the at least one of the front and rear doors frame to receive the sealing member in the sealing receiving recess.

6. The weather strip assembly according to claim 5,
wherein the sealing receiving recess is provided with ledges for catching the sealing member in the sealing receiving recess to restrain the sealing member in the sealing receiving recess, and
wherein the ledges form an opening between the ledges and a diameter of the sealing member is smaller than a length of the opening so that the sealing member inserted into the sealing receiving recess is not broken away from the sealing receiving recess and allows a portion of a side surface of the sealing member to be exposed through the opening.

7. The weather strip assembly according to claim 5, wherein the sealing receiving recess is provided with at least a second an additional sealing member for rotatably supporting the sealing member in the sealing receiving recess.

8. The weather strip assembly according to claim 7, wherein the at least an additional sealing member is formed in a shape of a cylindrical column having a diameter smaller than a diameter of the sealing member.

9. The weather strip assembly according to claim 8, further including at least a second sealing rotation shaft passing through the at least an additional sealing member and mounted in one of the front and rear doors so that the at least an additional sealing member is rotatable about the at least a second sealing rotation shaft.

10. The weather strip assembly according to claim 9, wherein the at least a second sealing rotation shaft is mounted in fixing blocks formed at an upper end portion and a lower end portion of the at least one of the front and rear doors respectively.

11. The weather strip assembly according to claim 7, wherein the at least an additional sealing member is formed to be spaced from each other.

12. The weather strip assembly according to claim 7, wherein at least a second sealing receiving portion for receiving the at least an additional sealing member and supporting a side of the at least an additional sealing member is formed at an inner surface of the sealing receiving recess.

13. The weather strip assembly according to claim 7, wherein the sealing member and the at least an additional sealing member are produced in a form extruded by extruding an elastic material, respectively.

14. The weather strip assembly according to claim 1, wherein the sealing member is provided in one of the front and rear doors while a guide block for abutting against the sealing member is formed in a height direction of the vehicle in another one of the front and rear doors.

15. The weather strip assembly according to claim 14, wherein the sealing member is provided at the front end portion of the rear door while the guide block is formed at the rear end portion of the front door.

16. The weather strip assembly according to claim 1, wherein no center pillar is formed in the vehicle.

\* \* \* \* \*